(12) United States Patent
Greco et al.

(10) Patent No.: US 7,159,140 B2
(45) Date of Patent: Jan. 2, 2007

(54) METHOD TO TRANSFER INFORMATION BETWEEN DATA STORAGE DEVICES

(75) Inventors: Paul M. Greco, Tucson, AZ (US); James M. Karp, Tucson, AZ (US); David L. Swanson, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 462 days.

(21) Appl. No.: 10/645,061

(22) Filed: Aug. 21, 2003

(65) Prior Publication Data

US 2005/0044315 A1   Feb. 24, 2005

(51) Int. Cl.
*G06F 11/00* (2006.01)
(52) U.S. Cl. .......................................... 714/7; 714/42
(58) Field of Classification Search .................... 714/7, 714/42
See application file for complete search history.

(56) References Cited

U.S. PATENT DOCUMENTS

| | | | | |
|---|---|---|---|---|
| 4,959,852 A | | 9/1990 | Kern et al. ................... 379/70 |
| 5,430,855 A | | 7/1995 | Walsh et al. ................. 395/275 |
| 5,752,257 A | | 5/1998 | Ripoll et al. ................. 711/114 |
| 5,838,891 A | * | 11/1998 | Mizuno et al. ................. 714/5 |
| 5,911,150 A | | 6/1999 | Peterson et al. ............. 711/162 |
| 5,915,081 A | * | 6/1999 | Yamamoto et al. ............. 714/6 |
| 5,941,994 A | * | 8/1999 | DeKoning et al. ............. 714/7 |
| 6,009,466 A | * | 12/1999 | Axberg et al. .............. 709/220 |
| 6,058,454 A | * | 5/2000 | Gerlach et al. ............. 711/114 |
| 6,148,352 A | * | 11/2000 | Coale et al. ................. 710/100 |
| 6,154,850 A | | 11/2000 | Idleman et al. ................. 714/5 |
| 6,178,520 B1 | * | 1/2001 | DeKoning et al. .............. 714/5 |
| 6,179,486 B1 | * | 1/2001 | Wallach et al. .............. 710/302 |
| 6,347,359 B1 | * | 2/2002 | Smith et al. ................. 711/114 |
| 6,487,644 B1 | | 11/2002 | Huebsch et al. ............ 711/162 |
| 6,549,978 B1 | * | 4/2003 | Mansur et al. .............. 711/114 |
| 6,640,278 B1 | * | 10/2003 | Nolan et al. .................... 711/6 |
| 6,725,394 B1 | * | 4/2004 | Bolt .............................. 714/7 |
| 6,754,767 B1 | * | 6/2004 | Gold ........................... 711/114 |
| 6,766,478 B1 | * | 7/2004 | Leung .......................... 714/42 |
| 6,862,173 B1 | * | 3/2005 | Konshak et al. ............ 361/685 |
| 6,961,867 B1 | * | 11/2005 | Goodman et al. .............. 714/5 |
| 7,010,720 B1 | * | 3/2006 | Maeda et al. ................... 714/7 |
| 2003/0041283 A1 | * | 2/2003 | Murphy et al. ................ 714/13 |
| 2003/0182494 A1 | * | 9/2003 | Rodrigues et al. .......... 711/100 |
| 2004/0103244 A1 | * | 5/2004 | Fujimoto et al. ........... 711/113 |
| 2005/0168934 A1 | * | 8/2005 | Wendel et al. .............. 361/685 |
| 2005/0193273 A1 | * | 9/2005 | Burkey ........................ 714/42 |

* cited by examiner

*Primary Examiner*—Bryce P. Bonzo
(74) *Attorney, Agent, or Firm*—Dale F. Regelman

(57) ABSTRACT

A method to transfer information between data storage devices. The method provides an information storage assembly comprising a frame, a memory device disposed on that frame, information written to that memory device, a power supply removeably attached to the frame, and a first data storage device comprising a first identity removeably attached the frame. The method writes first configuration information to the memory device. If the method detects an error in the first data storage device, then the method removes the first data storage device from the frame. The method further provides a replacement data storage device, removeably attaches that replacement data storage device to the frame, and determines if the replacement device uses the first configuration information. If the replacement device uses the first configuration information, then the method provides the first configuration information to the replacement data storage device from the memory device.

6 Claims, 7 Drawing Sheets

METHOD TO TRANSFER INFORMATION BETWEEN DATA STORAGE DEVICES

FIELD OF THE INVENTION

Applicants' invention relates to an apparatus and method to transfer information between data storage devices.

BACKGROUND OF THE INVENTION

Automated media storage libraries are known for providing cost effective access to large quantities of stored media. Generally, media storage libraries include a large number of storage slots in which are stored data storage media. The portable data storage media are typically housed in a portable container, such as a tape cartridge, an optical cartridge, a disk cartridge, and the like. One (or more) accessors typically access the data storage media from the storage slots and deliver the accessed media to a data storage drive for reading and/or writing data on the accessed media. Suitable electronics operate the accessor(s) and operate the data storage drive(s) to transmit to, and/or to receive data from, an attached on-line host computer system.

In a conventional automated media storage library, the storage slots are arranged in a planar orthogonal arrangement forming a "wall" of storage slots for holding data storage media. The plane may be a flat plane, or may be a cylindrical plane. To double the storage capacity, two "walls" of storage slots may be provided on either side of the accessor.

A number of different companies manufacture automated media storage libraries today, each model displaying various different features. One example is the IBM Enterprise TotalStorage® Media Library. Some of the automated media storage libraries have dual or multiple accessors to provide a level of redundancy and/or improved performance.

Because of the ever-increasing amounts of data generated and saved, many data processing systems remain operational around-the-clock, i.e. a "24/7/365" operation. Taking a data processing system off-line for maintenance is many times not acceptable. What is needed is an apparatus and method to replace a malfunctioning data storage device with a replacement device, where that apparatus and method keeps the data processing system operational, and transfers vital product data from the original data storage device to the replacement data storage device.

SUMMARY OF THE INVENTION

Applicants' invention includes an information storage assembly. Applicants' information storage assembly includes a frame, a memory device disposed on that frame, first information written to said memory device, a power supply removeably attached to the frame, and a data storage device removeably attached to the frame.

Applicants' invention further includes a method to transfer information between data storage devices. The method provides an information storage assembly comprising a frame, a memory device disposed on said frame, information written to the memory device, a power supply removeably attached to the frame, and a first data storage device comprising a first identity removeably attached to the frame. The method writes first configuration information from the first data storage device to the memory device.

If the method detects an error in the first data storage device, the method then removes the first data storage device from the frame, provides a replacement data storage device, removeably attaches that replacement data storage device to the frame, and determines if the replacement data storage device uses the first configuration information. If the replacement data storage device uses the first configuration information, then the method provides the first configuration information to the replacement data storage device from the memory device.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a data storage assembly disposed in a data storage and retrieval system. The following description of Applicants' method to transfer information between data storage devices is not meant, however, to limit Applicants' invention to magnetic tape drives, or to data processing applications, as the invention herein can be applied to replacement of a data storage device in general.

Figure 1:
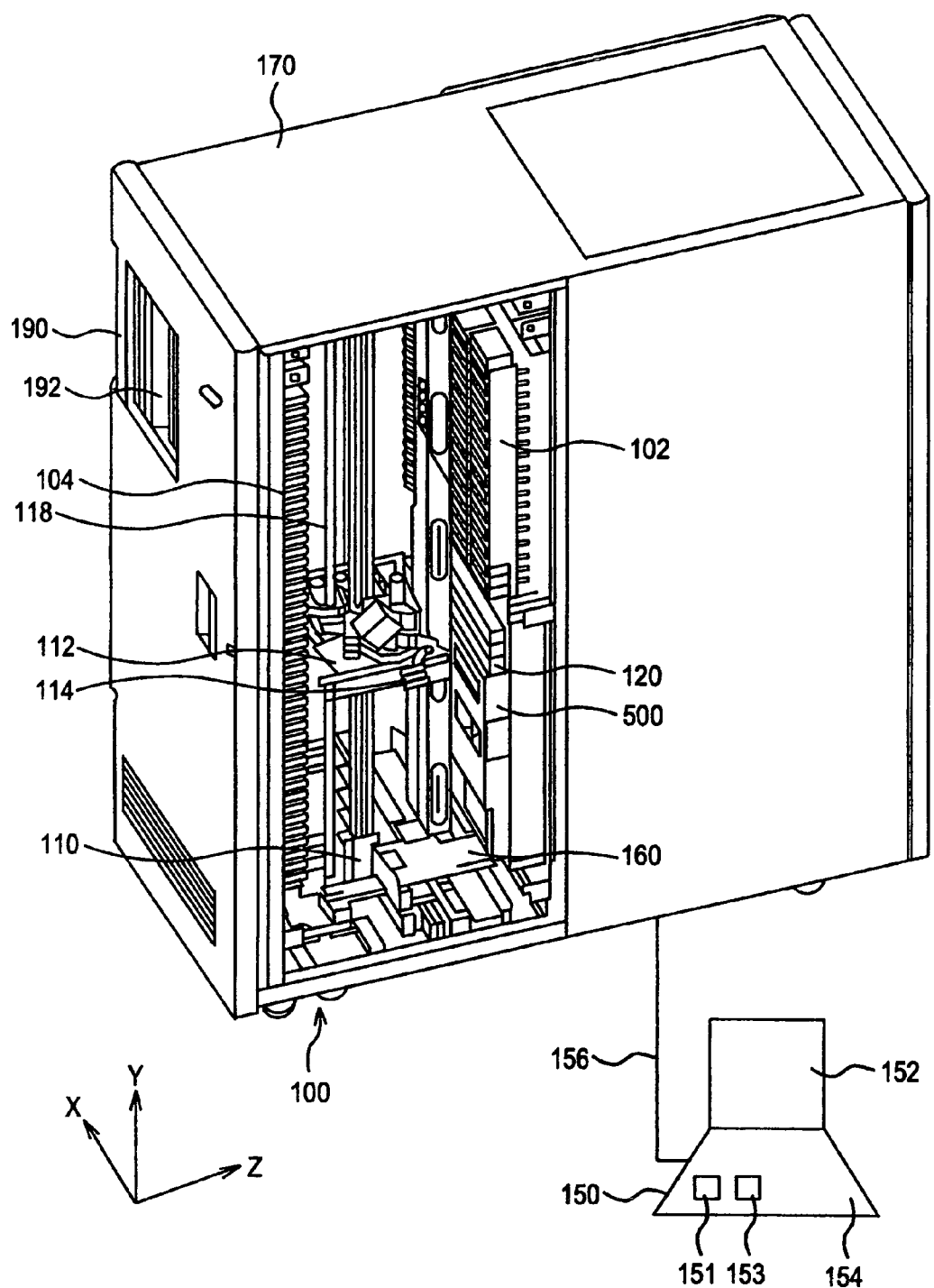
FIG. 1 is a perspective view of one embodiment of Applicants' data storage and retrieval system.
Figure 2:
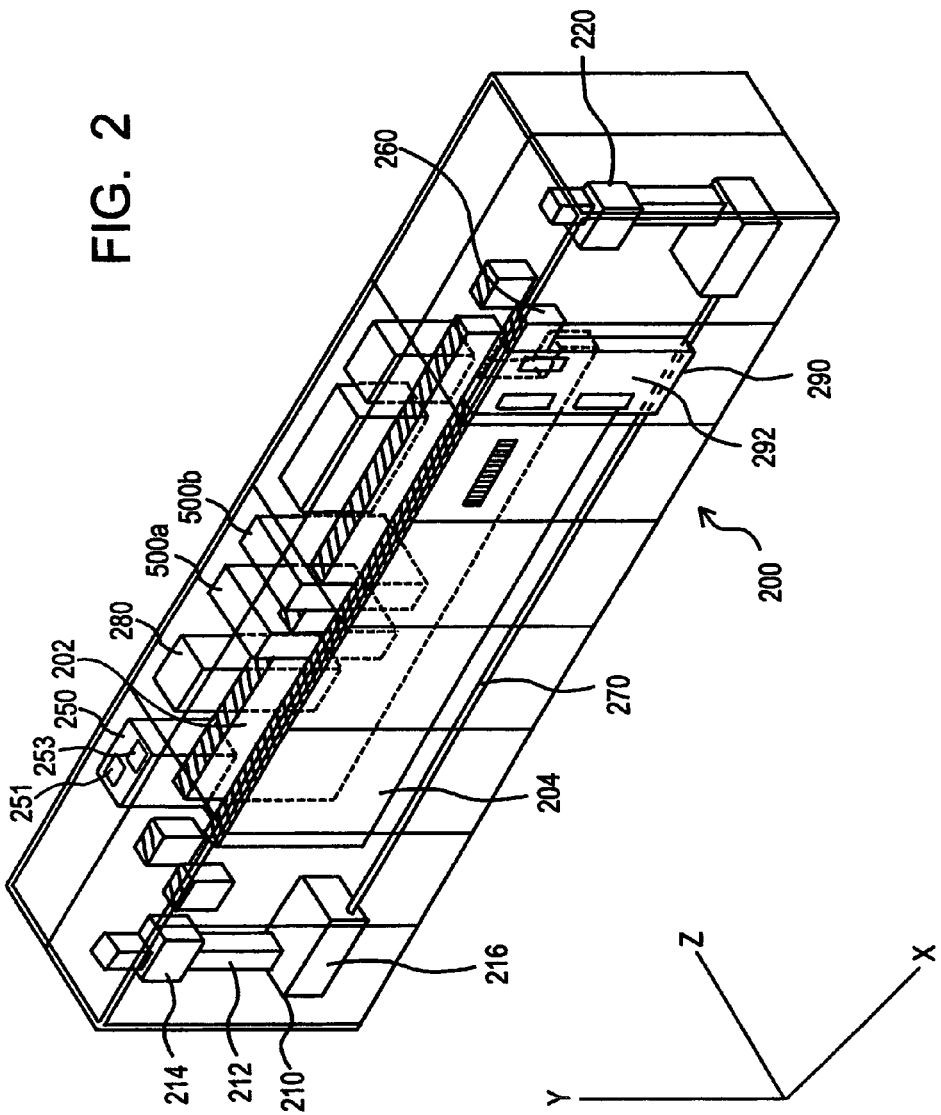
FIG. 2 is a perspective view of another embodiment of Applicants' data storage and retrieval system.
Figure 5:
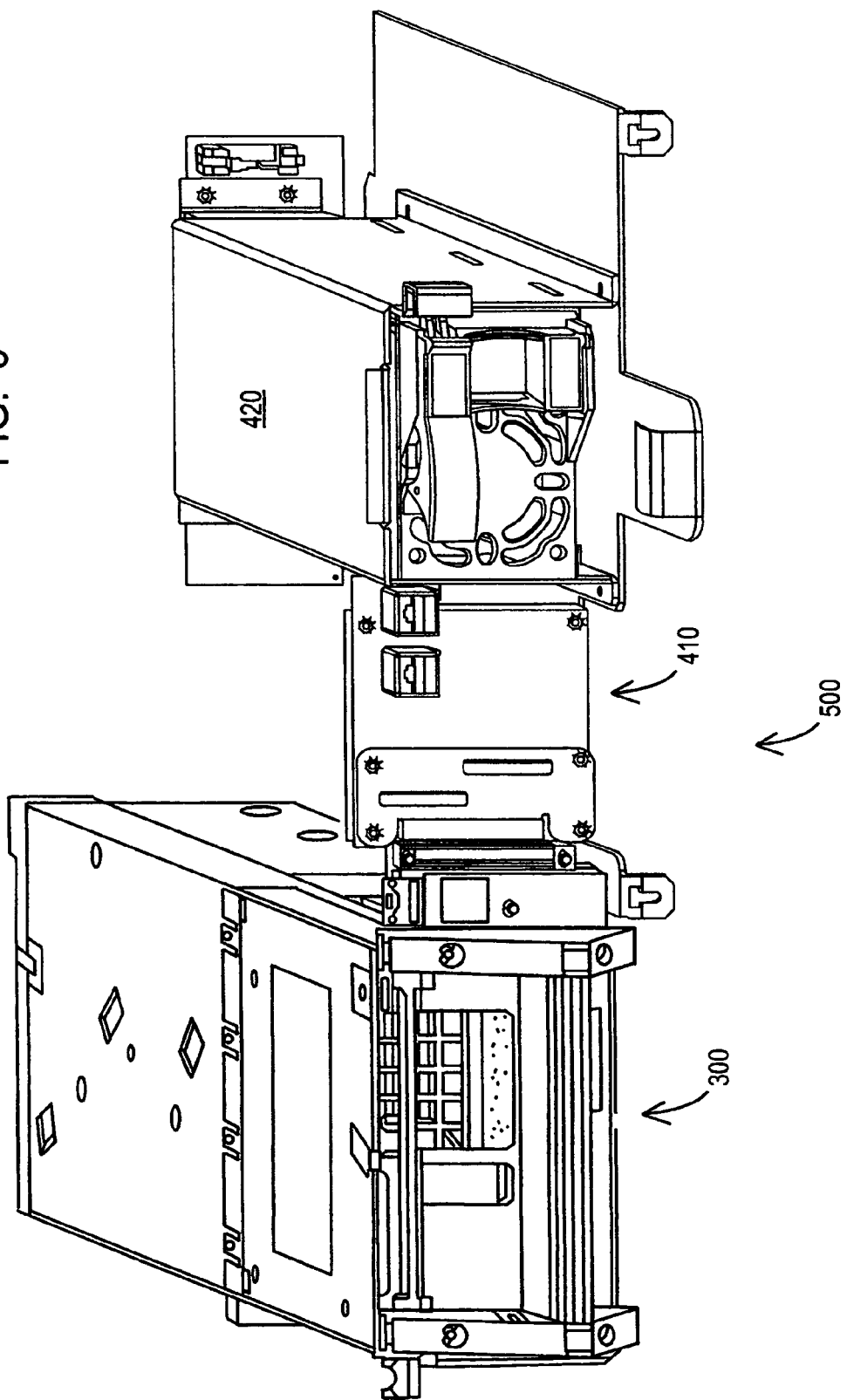
FIG. 5 is a perspective view showing Applicants' data storage assembly which includes Applicants' data storage device, frame, and power supply.

FIG. 1 shows information storage and retrieval system 100. System 100 includes one or more information storage assemblies, such as assembly 500 (FIGS. 1, 2, 5). Assembly 500 comprises a mechanical subassembly, i.e. a frame, a hot swappable power supply, and a hot swappable data storage device, where that data storage device comprises, for example, a floppy disk drive, an optical disk drive, a magnetic tape drive, electronic media, and the like. By "hot swappable," Applicants mean a device that can be removed from system 100 while that system remains operational.

System 100 further includes one or a plurality of portable data storage cartridges (not shown in FIG. 1) stored in one or a plurality of storage slots disposed in first storage wall 102 and/or second storage wall 104. Each cartridge contains a data storage media internally disposed therein. Such data storage media includes optical media, magnetic media, tape media, electronic media, and the like.

System 100 also includes at least one robotic accessor 110 for transporting a specified portable data storage cartridge between a storage slot disposed in storage wall 102/104 and information storage assembly 500. Accessor 110 includes lifting servo section 112 on which is disposed gripper mechanism 114

Information storage assembly 500 is interconnected with one or more host computers. Control port 120 provides a control path into library 100. In certain embodiments information storage assembly 500 and control port 120 communicate with one or more host computers using the same one or more communication links.

In the embodiment shown in FIG. 1, system 100 also includes external system controller 150 in communication via communication link 156 with, and controlling the operation of, accessor 110 11. Controller 150 includes visual display device 152 and data input device 154. Import/export station 190 includes access door 192 pivotably attached to the front of system 100. Portable data storage cartridges can be placed in the system, or in the alternative, removed from the system, via station 190/access door 192.

System controller 150 further includes at least one computing processor. In certain embodiments, system controller 150 is in communication with one or more host computers from which system controller 150 receives instructions. Data to be recorded onto, or read from, a selected portable data storage cartridge is communicated between information storage assembly 130 and host computer 370 either via system controller 150, or directly between assembly 130 and the host computer.

Referring to FIG. 2, Applicants' automated data storage and retrieval system 200 is shown having a first wall of storage slots 202 and a second wall of storage slots 204. Portable data storage media are individually stored in these storage slots. Certain of these data storage media are disposed within a portable container. Examples of such data storage media include magnetic tapes, optical disks of various types, including ROM, WORM, PROM, Non-volatile RAM, and rewritable, and the like.

Automated data storage and retrieval system 200 includes one or more accessors, such as accessors 210 and 220. Accessors 210 and 220 travel bi-directionally along rail 270 in an aisle disposed between first wall of storage slots 202 and second wall of storage slots 204. Accessors 210 and 220 retrieve portable data storage cartridges disposed in first storage wall 202 and second storage wall 204, and transport those cartridges to information storage assembly 500a (FIGS. 1, 2, 5) or to information storage assembly 500b (FIGS. 1, 2, 5).

Control port 260 provides a control path into data storage and retrieval system 200. Import/export station 290 includes access door 292 pivotably attached to the front of system 200. Portable data storage cartridges can be placed in the system, or in the alternative, removed from the system, via station 290/access door 292. Operator panel 280 permits a user to communicate with Applicants' automated data storage and retrieval system 200. System 200 further includes library controller 250.

Referring now to FIG. 5, Applicants' information storage assembly 500 includes data storage device 300, frame 410, and power supply 420. Data storage device 300 can be removed from frame 410 while the data storage and retrieval system comprising assembly 500, such as system 100 and/or 200, remains operational. Power supply 420 can be removed from frame 410 while the data storage and retrieval system comprising assembly 500, such as system 100 and/or 200, remains operational.

Figure 3:
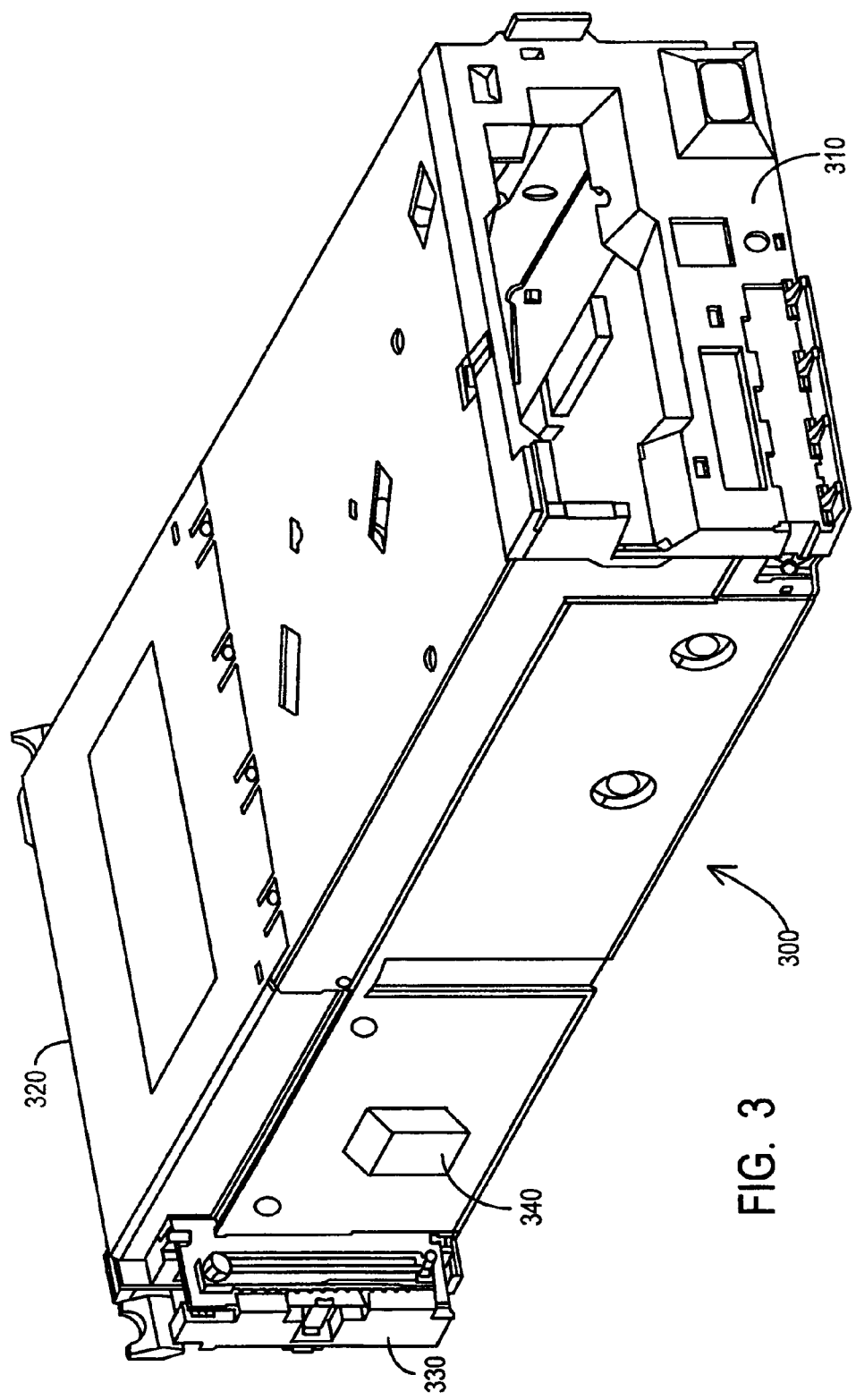
FIG. 3 is a perspective view of one embodiment of Applicants' data storage device.

FIG. 3 shows a perspective view of one embodiment of Applicants' data storage device 300. In certain embodiments, data storage device 300 comprises a magnetic tape drive. In certain embodiments, data storage device 300 comprises an IBM TotalStorage® Tape Drive 3592 (TotalStorage is a registered trademark of the IBM corporation). In certain embodiments, data storage device 300 comprises a hard disk drive unit. In certain embodiments, data storage device 300 comprises an electronic storage device.

Data storage device 300 includes first end 310 and second end 320. Connector assembly 330 is disposed on device 300 adjacent second end 320.

Figure 4:
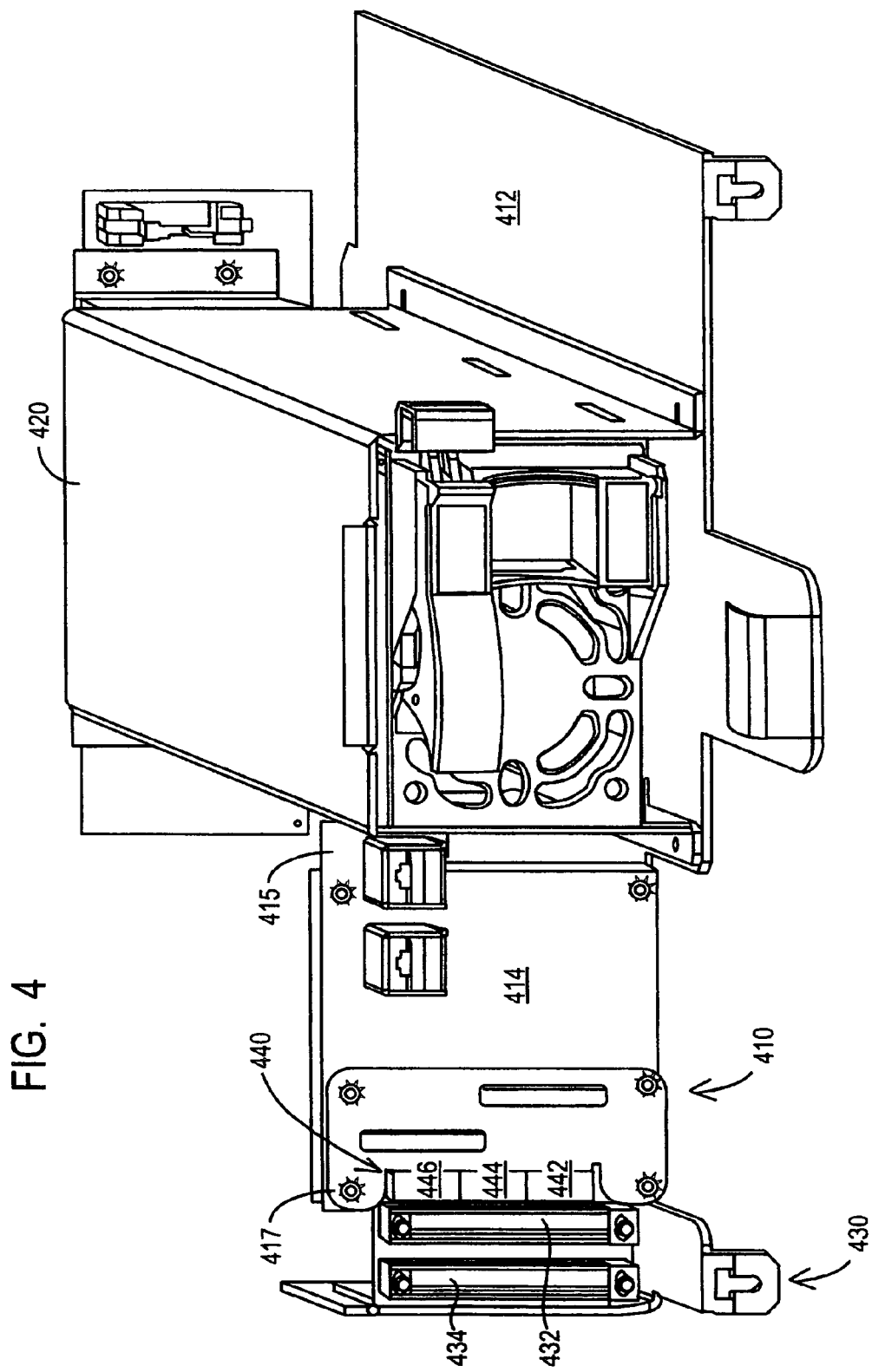
FIG. 4 is a perspective view of Applicants' data storage frame and removeable power supply.

FIG. 4 shows frame component 410, power supply component 420, and connector assembly component 430, of Applicants' information storage assembly 500 (FIGS. 1, 2, 5). Frame 410 includes vertical portion 414 and horizontal portion 412. Power supply 420 is removeably attached to frame portion 412 adjacent first end 415 of frame portion 410. Memory device 440 is disposed on frame 410. In certain embodiments, memory device 440 includes non-volatile memory. In certain embodiments, memory device 440 comprises an electronic memory device. In certain embodiments, memory device 440 comprises at least three memory portions, including a first memory portion 442, a second memory portion 444, and a third memory portion 446.

Information specific to data storage device 300 is written to memory device 440. In certain embodiments, such information comprises vital product data ("VPD"). In certain embodiments, such VPD includes an identifier for data storage device 300. In certain embodiments, that identifier comprises a serial number assigned to data storage device 300. In certain embodiments, that identifier comprises a persistent world wide identifier assigned to data storage device 300. In certain embodiments, that identifier comprises a physical address such as a slot number, a frame number, and the like. In certain embodiments, that identifier comprises an identifier for one or more virtual libraries, where a data storage and retrieval system has been partitioned into one or more virtual libraries. In certain embodiments, that VPD comprises device configuration information.

Connector assembly 430 is disposed on frame portion 414 adjacent second end 417. Connector assembly 430 includes at least one connector, such as connector 432. In the illustrated embodiment of FIG. 4, connector assembly 430 includes connector 432 and connector 434. In certain embodiments, connector 432 is used to couple frame 410 to a data storage device having a first form factor and/or a first device configuration. In certain embodiments, connector 434 is used to couple frame 410 to a data storage device having a second form factor and/or a second device configuration.

Connector 330 (FIG. 3) comprises a plug-in type connector which can be releaseably coupled with connector assembly 430. When data storage device 300 is removeably disposed in Applicants' information storage assembly 500, connector 330 is releaseably coupled to connector assembly 430. In certain embodiments of Applicants' invention, connector 330 has a "male" configuration and connector assembly 430 has a "female" configuration. In other embodiments, connector 330 has a "female" configuration and connector assembly 430 has a "male" configuration.

When connector 330 is releaseably coupled to connector assembly 430, data storage device 300 is interconnected with memory 440, such that data storage device 300 can read information from memory 440 and such that data storage device 300 can write information to memory 440. When connector 330 is releaseably attached to connector assembly 430, data storage device 300 is interconnected with power supply 420. When connector 330 is releaseably attached to connector assembly 430, data storage device 300 is interconnected with a control port, such as control port 260 (FIG. 2), and thereby, capable of communicating with one or more host computers.

Figure 6A:
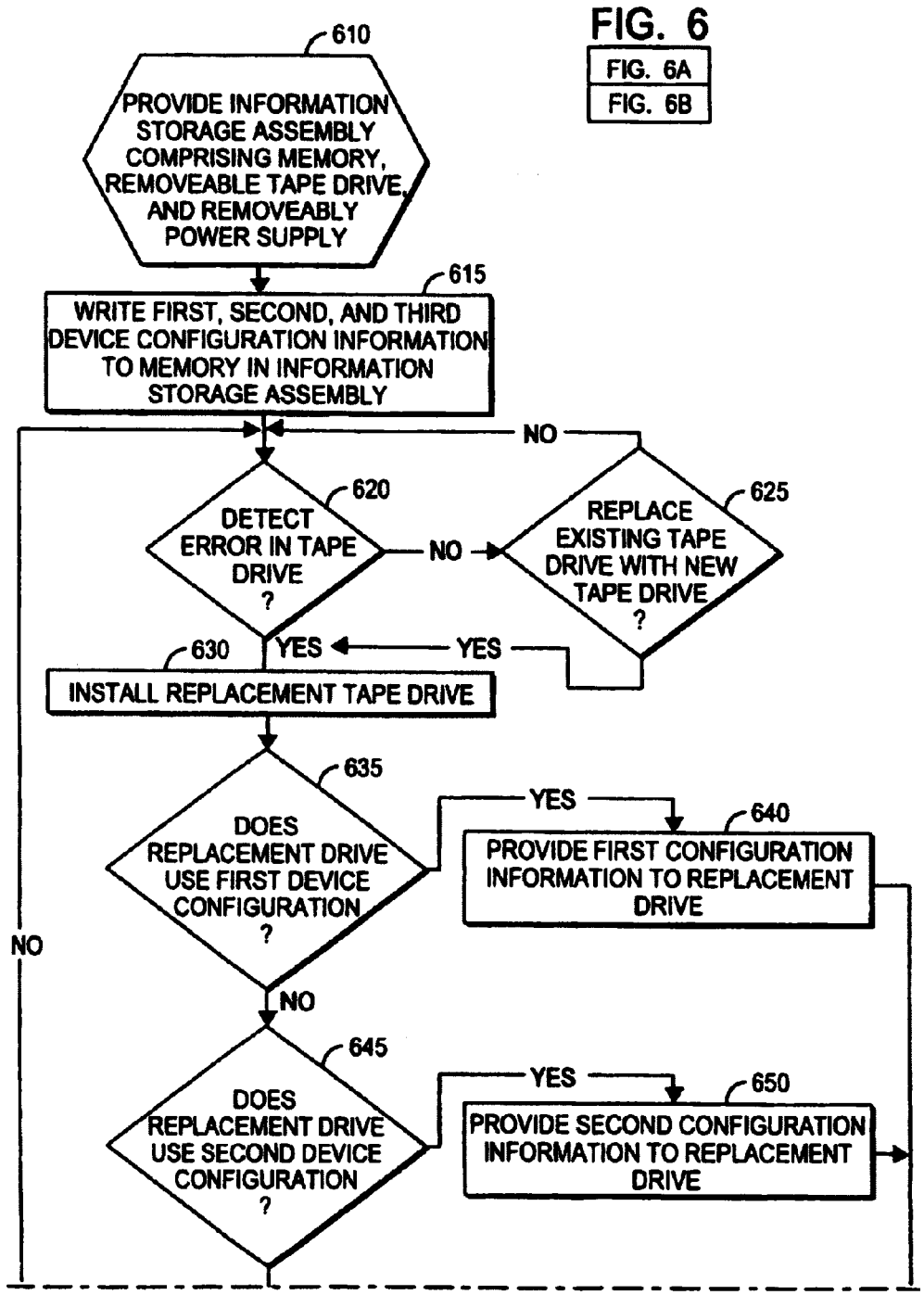
FIG. 6 is a flow chart summarizing the steps of Applicants' method.
Figure 6B:
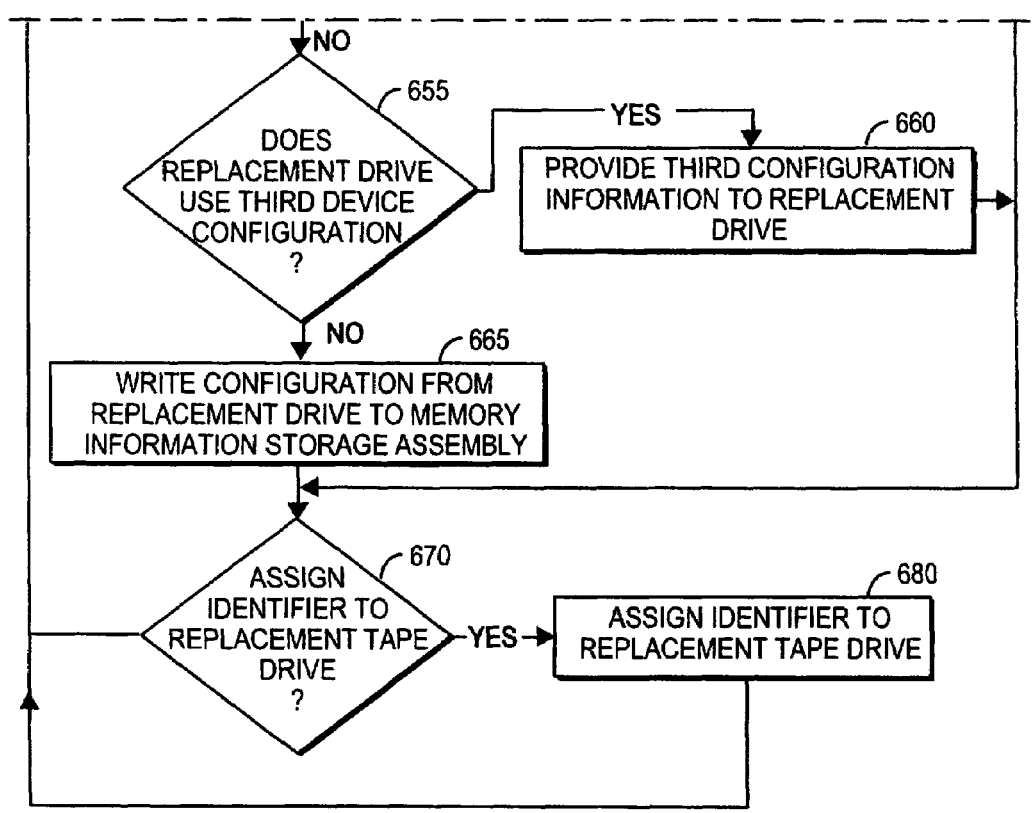

FIG. 6 summarizes the steps of Applicants' method to transfer information between data storage devices using Applicants' information storage assembly 500 (FIGS. 1, 2, 5). Referring now to FIG. 6, in step 610 Applicants' method provides an information storage assembly, such as information storage assembly 500, comprising a memory, a removeable data storage device, and a removeable power supply.

In step 615, Applicants' method writes a first data storage device configuration file to the memory device, such as memory 440 (FIG. 4), disposed in the information storage assembly. In certain embodiments, step 615 includes writing first configuration information from a data storage device disposed in Applicants' information storage assembly to the memory device disposed in Applicants' information storage assembly. In certain embodiments, the first configuration information is provided by an operator using an operator input station.

In certain embodiments, step 615 includes writing the first data storage device configuration to a first memory portion, such as memory portion 442 (FIG. 4), disposed within Applicants' information storage assembly. In certain embodiments, the first data storage device configuration file includes device microcode to operate a first embodiment of Applicants' data storage device.

In certain embodiments, step 615 further includes writing a second data storage device configuration file to the memory device, such as memory 440, disposed in the information storage assembly. In certain embodiments, step 615 includes writing second configuration information from a data storage device disposed in Applicants' information storage assembly to the memory device disposed in Applicants' information storage assembly. In certain embodiments, the second configuration information is provided by an operator using an operator input station.

In certain embodiments, step 615 includes writing the second data storage device configuration to a second memory portion, such as memory portion 444 (FIG. 4), disposed within Applicants' information storage assembly. In certain embodiments, the second data storage device configuration file includes device microcode to operate a second embodiment of Applicants' data storage device.

In certain embodiments, step 615 further includes writing a third data storage device configuration file to the memory device, such as memory 440, disposed in the information storage assembly. In certain embodiments, step 615 includes writing third configuration information from a data storage device disposed in Applicants' information storage assembly to the memory device disposed in Applicants' information storage assembly. In certain embodiments, the third configuration information is provided by an operator using an operator input station.

In certain embodiments, step 615 includes writing the third data storage device configuration to a third memory portion, such as memory portion 446 (FIG. 4), disposed within Applicants' information storage assembly. In certain embodiments, the third data storage device configuration file includes device microcode to operate a third embodiment of Applicants' data storage device.

In certain embodiments, the first data storage device, second data storage device, and third data storage device each comprise the same type of information storage medium, i.e. magnetic disk, magnetic tape, optical disk, electronic storage, and the like. In certain embodiments, one or more of the first data storage device, second data storage device, and third data storage device, each comprise different types of information storage media.

In step 620, Applicants' method determines if an error is detected in the data storage device disposed in Applicants' information storage assembly. In certain embodiments, step 620 is performed by a controller, such as controller 340 (FIG. 3), disposed in the data storage device. In certain embodiments, step 620 is performed by a controller, such as controller 150 (FIG. 1)/250 (FIG. 2), disposed in a data storage and retrieval system which includes Applicants' information storage assembly. In certain embodiments, step 620 is performed by a host computer.

If Applicants' method detects an error in the operation of the data storage device disposed in Applicants' information storage assembly, then the method transitions from step 620 to step 630. If Applicants' method does not detect an error in the data storage device in step 620, then the method transitions from step 620 to step 625 wherein the method determines if the existing data storage device should be immediately replaced even if no error has been detected. In certain embodiments, step 625 is performed by a controller, such as controller 340 (FIG. 3), disposed in the data storage device. In certain embodiments, step 625 is performed by a controller, such as controller 150 (FIG. 1)/250 (FIG. 2), disposed in a data storage and retrieval system which includes Applicants' information storage assembly. In certain embodiments, step 625 is performed by a host computer.

A properly functioning data storage device may need to be replaced. For example, in certain embodiments an older data storage device is replaced with a newer device at one or more designated time intervals. In certain embodiments, a data storage device comprising a first information storage medium is replaced with a data storage device comprising a second information storage medium.

If Applicants' method determines in step 625 that existing data storage device should not be immediately replaced, then the method transitions from step 625 to step 620 and continues. If Applicants' method determines in step 625 that the existing data storage device should be replaced, then the method transitions from step 625 to step 630 wherein the existing data storage device is removed from Applicants' information storage assembly and a replacement data storage device is installed in that information storage assembly. In certain embodiments, step 630 is performed by field service personnel. Applicants' method transitions from step 630 to step 635.

In step 635, Applicants' method determines if the replacement data storage device utilizes the first device configuration of step 615. In certain embodiments, step 635 is performed by a controller, such as controller 340 (FIG. 3), disposed in the replacement data storage device. In certain embodiments, step 635 is performed by a controller, such as controller 150 (FIG. 1)/250 (FIG. 2), disposed in a data storage and retrieval system which includes Applicants' information storage assembly. In certain embodiments, step 635 is performed by a host computer.

In certain embodiments, step 635 is performed by an operator using an operator input station. In certain embodiments, the operator input station comprises part of the data storage and retrieval system comprising the replacement drive. In certain embodiments, the operator input station is external to the data storage and retrieval system comprising the replacement drive.

If Applicants' method determines in step 635 that the replacement data storage device utilizes the first device configuration, then the method transitions from step 635 to step 640 wherein the method provides the first device configuration from the memory device, such as memory device 440, disposed in Applicants' information storage assembly, such as assembly 500, to the replacement data storage device.

In certain embodiments, the first device configuration comprises an identifier. In these embodiments, step 640 further includes assigning that identifier to the replacement drive. Applicants' method transitions from step 640 to step 670.

If Applicants' method determines in step 635 that the replacement data storage device does not utilize the first device configuration, then the method transitions from step 635 to step 645 wherein the method determines if the replacement data storage device utilizes the second device configuration of step 615. In certain embodiments, step 645 is performed by a controller, such as controller 340 (FIG. 3), disposed in the replacement data storage device. In certain embodiments, step 645 is performed by a controller, such as controller 150 (FIG. 1)/250 (FIG. 2), disposed in a data storage and retrieval system which includes Applicants' information storage assembly. In certain embodiments, step 645 is performed by a host computer.

In certain embodiments, step 645 is performed by an operator using an operator input station. In certain embodiments, the operator input station comprises part of the data storage and retrieval system comprising the replacement drive. In certain embodiments, the operator input station is external to the data storage and retrieval system comprising the replacement drive.

If Applicants' method determines in step 645 that the replacement data storage device utilizes the second device configuration, then the method transitions from step 645 to step 650 wherein the method provides the second device configuration from the memory device, such as memory device 440, disposed in Applicants' information storage assembly, such as assembly 500, to the replacement data storage device.

In certain embodiments, the second device configuration comprises an identifier. In these embodiments, step 650 further includes assigning that identifier to the replacement drive. Applicants' method transitions from step 650 to step 670.

If Applicants' method determines in step 645 that the replacement data storage device does not utilize the second device configuration, then the method transitions from step 635 to step 655 wherein the method determines if the replacement data storage device utilizes the third device configuration of step 615. In certain embodiments, step 655 is performed by a controller, such as controller 340 (FIG. 3), disposed in the replacement data storage device. In certain embodiments, step 655 is performed by a controller, such as controller 150 (FIG. 1)/250 (FIG. 2), disposed in a data storage and retrieval system which includes Applicants' information storage assembly. In certain embodiments, step 655 is performed by a host computer.

In certain embodiments, step 655 is performed by an operator using an operator input station. In certain embodiments, the operator input station comprises part of the data storage and retrieval system comprising the replacement drive. In certain embodiments, the operator input station is external to the data storage and retrieval system comprising the replacement drive.

If Applicants' method determines in step 655 that the replacement data storage device utilizes the third device configuration, then the method transitions from step 655 to step 660 wherein the method provides the third device configuration from the memory device, such as memory device 440, disposed in Applicants' information storage assembly, such as assembly 500, to the replacement data storage device.

In certain embodiments, the third device configuration comprises an identifier. In these embodiments, step 660 further includes assigning that identifier to the replacement drive. Applicants' method transitions from step 660 to step 670

If Applicants' method determines in step 655 that the replacement drive does not utilize a third device configuration, then the method transitions from step 655 to step 665 wherein the method writes configuration information from the replacement device to the memory device, such as memory device 440, disposed in Applicants' information storage assembly, such as assembly 500.

Applicants' method transitions from step 665 to step 670 wherein the method determines whether to assign an identifier to the replacement data storage device. In certain embodiments, step 670 is performed by a controller, such as controller 340 (FIG. 3), disposed in the replacement data storage device. In certain embodiments, step 670 is performed by a controller, such as controller 150 (FIG. 1)/250 (FIG. 2), disposed in a data storage and retrieval system which includes Applicants' information storage assembly. In certain embodiments, step 670 is performed by a host computer.

In certain embodiments, step 670 is performed by an operator using an operator input station. In certain embodiments, the operator input station comprises part of the data storage and retrieval system comprising the replacement drive. In certain embodiments, the operator input station is external to the data storage and retrieval system comprising the replacement drive.

If Applicants' method determines in step 670 not to assign an identifier to the replacement data storage device, then the method transitions from step 670 to step 620 and continues. If Applicants' method determines in step 670 to assign an identifier to the replacement data storage device, then the method transitions from step 670 to step 680 wherein the method provides an identifier and assigns that identifier to the replacement data storage device. In certain embodiments, the identifier of step 680 comprises a serial number. In certain embodiments, the identifier of step 680 comprises a persistent world wide identifier. In certain embodiments, the identifier of step 680 comprises a physical address such as a slot number, a frame number, and the like. In certain embodiments, the identifier of step 680 comprises an identifier for one or more virtual libraries, where a data storage and retrieval system has been partitioned into one or more virtual libraries.

Applicants' method transitions from step 680 to step 620 and continues.

Applicants' invention further includes an article of manufacture comprising a computer useable medium, such as computer useable medium 151 (FIG. 1)/251 (FIG. 2), having computer readable program code disposed therein to transfer information between hot swap data storage devices using the steps of FIG. 6.

Applicants' invention further includes a computer program product, such as computer program product 153 (FIG. 1)/253 (FIG. 2), usable with a programmable computer processor having computer readable program code embodied therein method to transfer information between hot swap data storage devices using the steps of FIG. 6. The programming of the present invention may comprise a computer program product embodied as program code stored in a storage device, such as a magnetic disk drive or memory, etc., in a computer, or may comprise an article of manufacture, such as a CD ROM, magnetic tape, etc.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to transfer information between data storage devices, comprising the steps of:
providing an information storage assembly comprising a frame, a memory device disposed on said frame, information written to said memory device, a power supply removeably attached to said frame, and a first data storage device comprising a first identity removeably attached to said frame;
writing first configuration information from said first data storage device to said memory device;
detecting an error in said first data storage device;
removing said first data storage device from said frame;
providing a replacement data storage device;
removeably attaching said replacement data storage device to said frame;
determining if said replacement data storage device utilizes said first configuration information;
operative if said replacement data storage device uses said first configuration information, providing said first configuration information to said replacement data storage device from said memory device;
writing second configuration information to said memory device;
determining if said replacement data storage device uses said second configuration information;
operative if said replacement data storage device uses said second configuration information, providing said second configuration information to said replacement data storage device;
writing third configuration information to said memory device;
determining if said replacement data storage device uses said third configuration information;
operative if said replacement data storage device uses said third configuration information, providing said third configuration information to said replacement data storage device;
operative if said replacement data storage devices does not utilize said first configuration information or said second configuration information or said third configuration information, writing configuration information from said replacement data storage device to said memory disposed in the information storage assembly.

2. The method of claim 1, further comprising the steps of:
determining if an identifier is to be assigned to said replacement data storage device;
operative if an identifier is to be assigned to said replacement data storage device:
providing an identifier; and
assigning said identifier to said replacement data storage device.

3. An article of manufacture comprising a computer useable medium having computer readable program code disposed therein to transfer information from a first data storage device to a replacement data storage device, wherein said first data storage device is removeably disposed in an information storage assembly comprising a frame, a memory device disposed on said frame, information written to said memory device, a power supply removeably attached to said frame, the computer readable program code comprising a series of computer readable program steps to effect:
writing first configuration information from said first data storage device to said memory device;
determining if said replacement data storage device utilizes said first configuration information;
operative if said replacement data storage device uses said first configuration information, providing said first configuration information to said replacement data storage device from said memory device after said first data storage device has been removed and said replacement data storage device removeably attached to said frame;
writing second configuration information to said memory device;
determining if said replacement data storage device uses said second configuration information;
operative if said replacement data storage device uses said second configuration information, providing said second configuration information to said replacement data storage device;
writing third configuration information to said memory device;
determining if said replacement data storage device uses said third configuration information;
operative if said replacement data storage device uses said third configuration information, providing said third configuration information to said replacement data storage device;
operative if said replacement data storage devices does not utilize said first configuration information or said second configuration information or said third configuration information, writing configuration information from said replacement data storage device to said memory disposed in the information storage assembly.

4. An article of manufacture comprising a computer useable medium having computer readable program code disposed therein to transfer information from a first data storage device to a replacement data storage device, wherein said first data storage device is removeably disposed in an information storage assembly comprising a frame, a memory device disposed on said frame, information written to said memory device, a power supply removeably attached to said frame, the computer readable program code comprising a series of computer readable program steps to effect:
writing first configuration information from said first data storage device to said memory device;
determining if said replacement data storage device utilizes said first configuration information;
operative if said replacement data storage device uses said first configuration information, providing said first configuration information to said replacement data storage device from said memory device after said first data storage device has been removed and said replacement data storage device removeably attached to said frame;
determining if an identifier is to be assigned to said replacement data storage device;
operative if an identifier is to be assigned to said replacement data storage device:
providing an identifier; and
assigning said identifier to said replacement data storage device.

5. A computer program product usable with a programmable computer processor having computer readable program code embodied therein method to transfer information from a first data storage device to a replacement data storage device, wherein said first data storage device is removeably disposed in an information storage assembly comprising a frame, a memory device disposed on said frame, information written to said memory device, a power OF supply removeably attached to said frame, comprising:

- computer readable program code which causes said programmable computer processor to write first configuration information from said first data storage device to said memory device;
- computer readable program code which causes said programmable computer processor to detect an error in said first data storage device;
- computer readable program code which causes said programmable computer processor to provide said first configuration information to a replacement data storage device from said memory device after said first data storage device has been removed and said replacement data storage device removeably attached to said frame
- computer readable program code which causes said programmable computer processor to determine if said replacement data storage device uses said second configuration information;
- computer readable program code which, if said replacement data storage device uses said second configuration information, causes said programmable computer processor to provide said second configuration information to said replacement data storage device
- computer readable program code which causes said programmable computer processor to determine if said replacement data storage device uses said third configuration information;
- computer readable program code which, if said replacement data storage device uses said third configuration information, causes said programmable computer processor to provide said third configuration information to said replacement data storage device;
- computer readable program code which, if said replacement data storage devices does not utilize said first configuration information or said second configuration information or said third configuration information, causes said programmable computer processor to write configuration information from said replacement data storage device to said memory disposed in the information storage assembly.

6. A computer program product usable with a programmable computer processor having computer readable program code embodied therein method to transfer information from a first data storage device to a replacement data storage device, wherein said first data storage device is removeably disposed in an information storage assembly comprising a frame, a memory device disposed on said frame, information written to said memory device, a power supply removeably attached to said frame, comprising:

- computer readable program code which causes said programmable computer processor to write first configuration information from said first data storage device to said memory device;
- computer readable program code which causes said programmable computer processor to detect an error in said first data storage device;
- computer readable program code which causes said programmable computer processor to provide said first configuration information to a replacement data storage device from said memory device after said first data storage device has been removed and said replacement data storage device removeably attached to said frame
- computer readable program code which causes said programmable computer processor to determine if an identifier is to be assigned to said replacement data storage device;
- computer readable program code which, if an identifier is to be assigned to said replacement data storage device, causes said programmable computer processor to assign an identifier to said replacement data storage device.

* * * * *